Sept. 26, 1961 T. P. KESSLER 3,001,641
TORQUE TRANSMISSION FROM AN END MEMBER
Filed Dec. 9, 1957 3 Sheets-Sheet 1

INVENTOR
Theodore P. Kessler
BY Henry H. Snelling
ATTORNEY

Sept. 26, 1961     T. P. KESSLER     3,001,641
TORQUE TRANSMISSION FROM AN END MEMBER
Filed Dec. 9, 1957     3 Sheets-Sheet 2

INVENTOR
Theodore P. Kessler
BY Henry H. Snelling
ATTORNEY

INVENTOR
Theodore P. Kessler
BY Henry H. Snelling
ATTORNEY

United States Patent Office 3,001,641
Patented Sept. 26, 1961

3,001,641
TORQUE TRANSMISSION FROM AN END MEMBER
Theodore P. Kessler, Rancocas, N.J.
(226 Chester Ave., Moorestown, N.J.)
Filed Dec. 9, 1957, Ser. No. 701,657
16 Claims. (Cl. 206—51)

This invention relates to transmission of torque through an elongated tube from one member to another where each of the members has a nonpermanent engagement with the torque transmitting tube. The principal object of the invention is to provide such a connection between each of the members and the tube so that a tube such as one made of cardboard will transmit to the driven member such rotation as is imparted to the driving member.

Another object of the invention is to provide an end panel assembly suited to grip firmly a tube so that the latter may be rotated and transmit torque.

A further object of the invention is to provide a support plate of simple inexpensive construction, preferably a metal stamping, that can readily be applied to each of two end panels, each of which is at one end of a tube of a material that has high elasticity but little strength against crushing.

Figure 1:
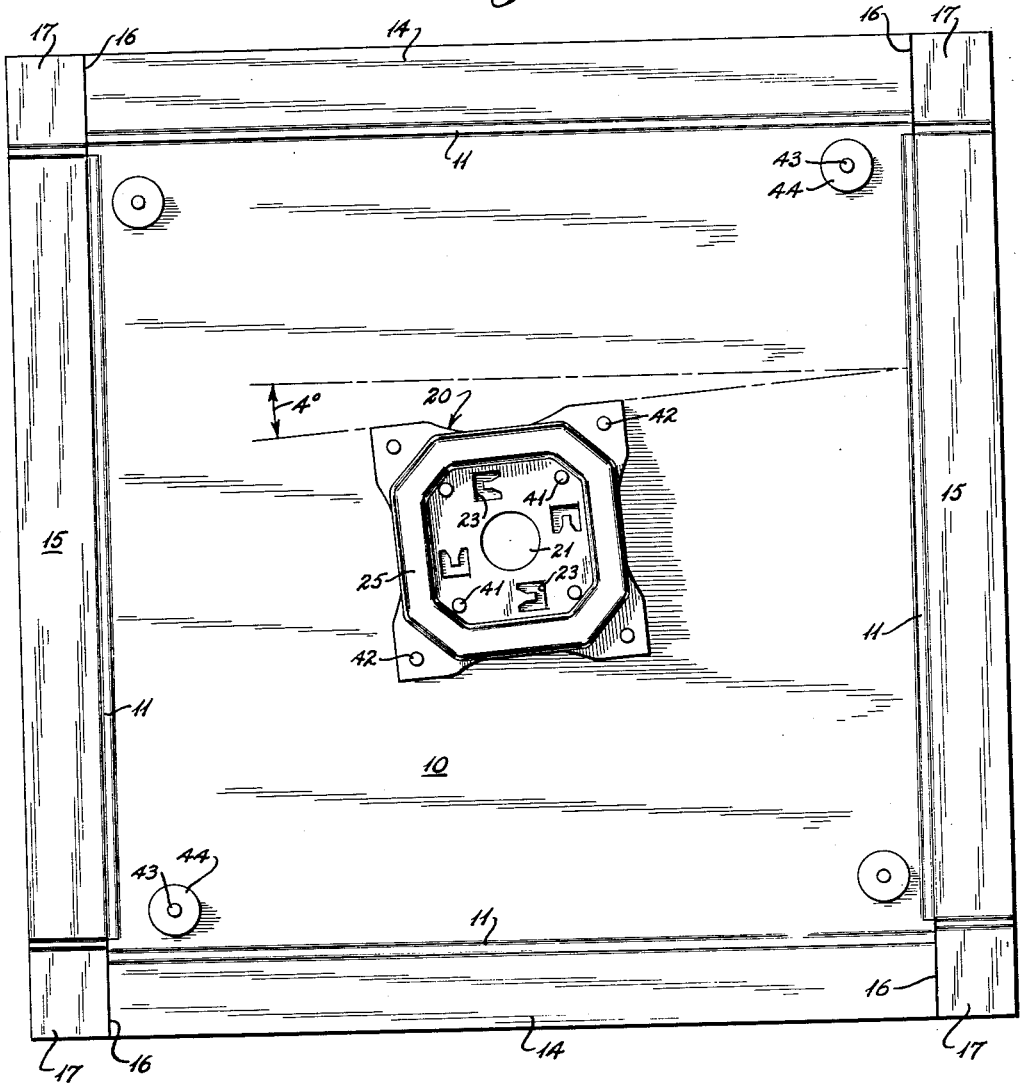
FIGURE 1 is an elevation of an end panel of a carton, the flanges of which are not yet bent to shape.
Figure 4:
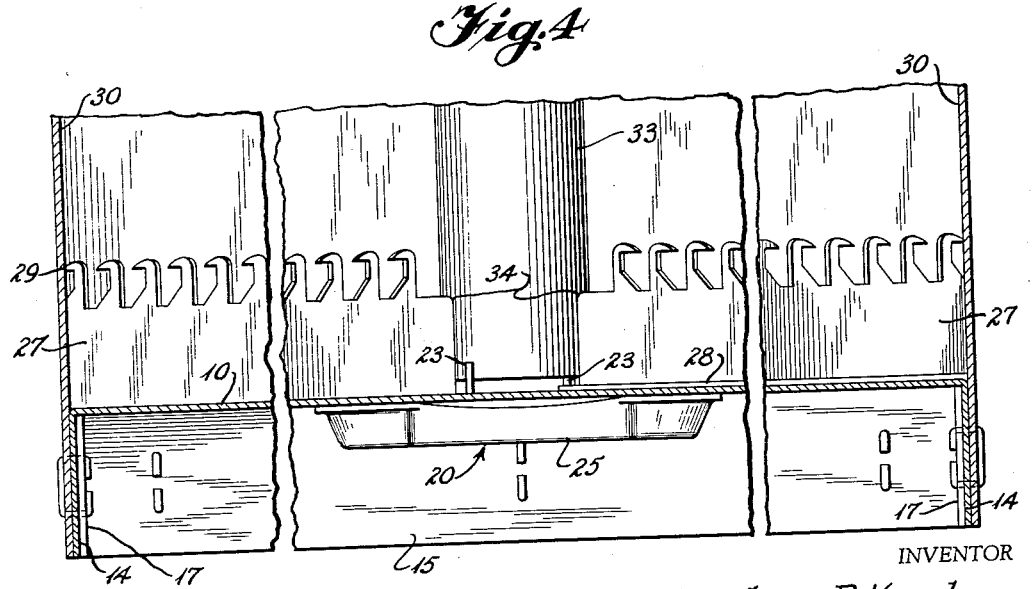
FIGURE 4 is a fragmentary section on line 4—4 of FIG. 2, showing the flanges of the end panel bent to final shape and secured to the outer cover of the carton.

In FIG. 1, the end panel 10 is creased as at 11 to provide four marginal flanges 14 and 15, each of the two latter being slit as at 16 to form a tab 17 at each end as these flanges are to be bent toward the viewer as in FIG. 1 and as better illustrated in FIG. 4, showing one end of the carton, the opposite end of the carton being exactly similar. The support plate 20 has a central hole 21 alined with a similar hole 22 in the panel 10. The support plate is generally square and is not parallel to the creases 11 or the margins of the side panel but is tilted at a small angle, usually 3° or 4°, for a purpose later to be described. Around the central hole 21 there is a series of struck-out prongs 23, usually four in number, bent away from the observer. To strengthen the support plate 20 which preferably is stamped from sheet steel, I form a continuous channel 25 entirely surrounding the four prongs 23.

Figure 2:
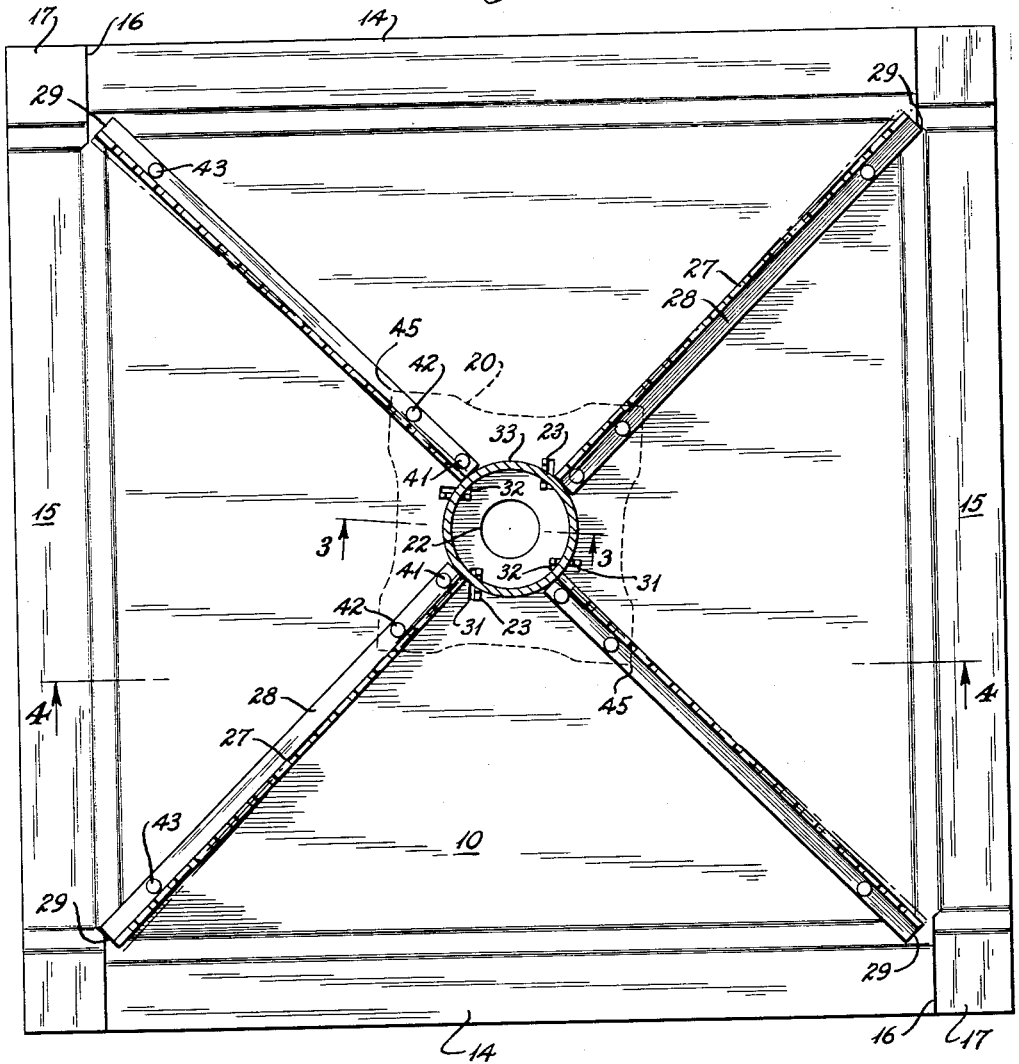
FIGURE 2 is an elevation showing the opposite side of the end panel.

Referring now particularly to FIG. 2 showing the opposite side of the end panel 10, four angularly bent metal members 27, which hereinafter are called hook strips, are secured to the inside face of the end panel 10 by their smaller flanges 28 so that the upright longer flanges are radial; that is, each hook strip extends in a line from the center of the panel to the nearer corner. The short flanges 28 in contact with the panel of opposite members are all bent in the same direction (clockwise as shown) and to strengthen the device the corner 29 of each strip penetrates slightly the outer cover 30 of the carton or other container.

The carton end panel is slotted as at 31 to receive the four prongs 23 of the supporting plate 20, the slots fitting the prongs snugly in their longer dimensions but fitting the prongs quite loosely in their shorter dimensions. The advantage of this construction is that it facilitates the positioning of the support plate on the carton end panel 10. Before permanent securing, the support plate may be turned very slightly counterclockwise so that each prong 23 is in firm contact with a longer side of the slot and the body of the supporting plate covers the balance of the slot so as to prevent dust from entering the inside of the carton through a gap in the struck-out portion not covered on the outside by the end panel, as would occur if the prong were in contact with the other side of the slot. The objection to slitting the carton to receive the prongs is that this construction has been found to make a ragged edge and the procedure recited keeps out the dust equally effectively.

Figure 3:
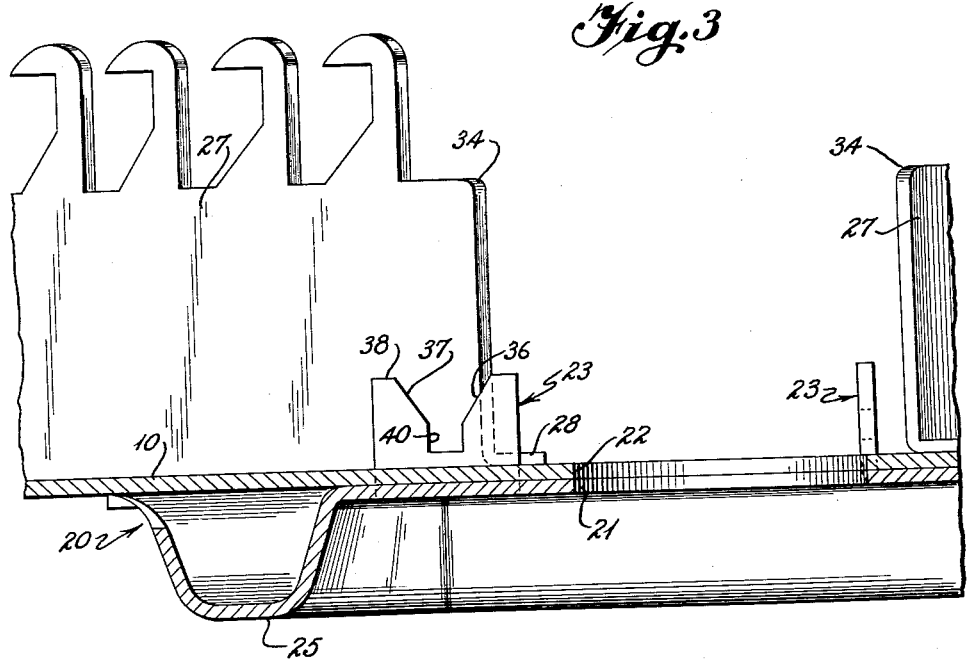
FIGURE 3 is a section on line 3—3 of FIG. 2 on larger scale but omitting the spacer tube between the two end panels of the carton.

It will be noted that the prongs 23 diagonally opposite each other are parallel and that one corner 32 of the slot 31 is substantially at the extension of a plane along the proximate face of the adjacent hook strip. In FIG. 2 the elongated spacer tube 33, usually of cardboard is about 40 inches long, 1¾ inches in outer diameter. The spacer tube 33 is engaged by each of the upstanding flanges 27 of the hook strips, the corner of each of which is rounded as at 34 to facilitate entry of the tube 33 which is then forced against the prongs 23 which are preferably shaped as best seen in FIG. 3 in which the hollow spacer tube 33 is purposely eliminated for clearness of illustration. The tube 33 is shown in full lines in FIG. 4.

Each prong 23 is actually a driving wedge having two downwardly converging sloping sides 36 and 37 which are truncated at their tops as at 38 to give a better life to the die which stamps the support plate. Instead of having the sloping sides come to a point at the bottom, the V notch which is about 35° is continued as a rectangular slot 40 for the above stated purpose, that is, to make the die last longer, but I find that the rectangular extension of the point of the V also aids materially in receiving overflow from some of the lower grade tubes as they are pushed to place within the V's of each of the four prongs 23 extending from the support plate 20 through the slots 31. The positioning of the prongs or extensions is such that the thickness of the tube is received evenly by the two sloping sides of the V of the prong and the acute angle, about 22½°, made by the wider face of the prong with a radial line passing through the center and a corner of the panel makes for a much firmer grip on the tube.

In FIG. 2 the outline of the supporting plate 20 is shown in light dashed lines to facilitate description of the rivets which hold the hook strips to the panel and to the support plate 20. The rivets 41, 42, and 43 for each strip are alined but this line is necessarily offset about a quarter of an inch and parallel to a diagonal line of the panel. Each of the four points 45 of the square support plate 20 is in alinement with the rivets 41, 42, and 43, the latter having a washer 44. This explains the slight tilting of the support plate 20 as it allows the rivets 41 and 42 to be close to the channel 25 and permits the use of a smaller support plate.

What is claimed is:

1. The combination with a member, of an open ended elongated tube to transmit torque along its length from the member when the latter is rotated, and means for detachably securing the member to the tube; said member being one end panel of a shipping carton having two end panels with the tube extending centrally between them, and said means being a plurality of circumferentially spaced transverse projections carried by the member, each projection gripping the tube on both its inside surface and its outside surface, whereby a tube of high elasticity but little strength against crushing may be used.

2. The combination of claim 1 in which each projection is a prong having two oppositely sloping sides defining a V notch.

3. The combination of claim 1 in which there are four equally spaced projections from the member, diagonally opposite projections being parallel, and each projection is roughly at right angles to both proximate projections so that the side of each projection is at an acute angle to a radius passing through the center of the projection.

4. The combination of claim 1 in which the tube is of cellulosic material, the end panel is of cellulosic material proximate the end of the tube, and a support plate located centrally of the panel, and the means are driving wedges integral with the plate and project through the panel to grip the tube at angularly spaced points.

5. A chuck for engaging a readily deformable tube of a type which can transmit torque, said tube being of a material that has high elasticity but little strength against crushing, said chuck comprising a sheet metal stamping having a series of integral struck-out projections equispaced from a central point and at equal distances apart, each projection comprising a flat portion at an acute angle to radial and having in its gripping end a V notch the center of which is spaced from said central point by a distance equal to one-fourth the sum of the inside and outside diameters of the tube to be engaged.

6. The chuck of claim 5 with a carton closing end panel having slots to receive the projections, flanged metal strips on the panel approximately radially positioned and about 90° apart, and rivets passing through the flanges of the metal strips, the panel and the chuck, the ends of the strips guiding the tube into a position centrally of the panel so that the tube will then engage both sloping sides of the V notch of each of the struck-out projections.

7. An end panel comprising a square sheet having four angularly bent marginal flanges, a tab integral with a marginal flange, and a central hole; a plurality of hook strips extending from proximate the central hole to a corner of the square sheet inside of the marginal portions, an integral right angular flange on each strip engaging the sheet, a substantially square support plate having a central hole alined with the hole in the sheet with the four edges of the support plate offset from parallelism with the margins of the square sheet by an angle of from two to five degrees, a series of prongs extending integrally from the support plate through the sheet, each prong having two oppositely sloping sides defining a V notch, a pair of rivets passing through the support plate, the sheet, and the flange of each strip, and a third rivet near each corner of the panel securing the flange of each strip to the sheet, the three rivets of each strip flange being in exact alinement and being parallel to lines from the center of the two alined holes to the corners of the sheet.

8. The panel of claim 7 in which the support plate is a metal stamping with a continuous channel enclosing the prongs and four of the rivets, and the prongs are driving wedges adapted to engage a cardboard tube snugly engaging all four of the hook strips, and the panel is slotted to receive the prongs.

9. A support plate for an end panel comprising a sheet metal stamping having four equispaced integral driving wedges extending at right angles to the plate, each wedge having a notch formed by two converging sloping sides joined by a rectangular recess forming the bottom of the notch, whereby a pair of end panels may grip a cardboard tube between them with the tube held in the four wedges at each end.

10. In combination, a carton end panel having a series of slots, a support plate having a series of prongs extending through said slots, each prong having a V notch, a tube to transmit torque from the carton end panel to a similar opposite carton end panel, said tube being gripped in each of the V notches, and means to secure the support plate to the end panel.

11. The combination of claim 10, in which the prongs are rectangular in cross-section and the slots fit snugly the longer sides of the prongs and fit the shorter sides loosely whereby the support plate may be assembled with the end panel and then the support plate may be rotated to bring each prong into firm contact with a longer side of the slot with the body of the support plate covering the balance of the slot so as to prevent dust from entering the inside of the carton, then be fastened in place by said means.

12. A support plate for attachment to a carton end panel comprising a base of sheet metal having four integral prongs extending at right angles to the base, each prong having a central rectangular slot bounded by truncated sloping sides forming a V notch leading to the slot, whereby when a cardboard spacer tube is gripped by the four prongs, the overflow from the tube will be directed by the sloping sides into the rectangular slot.

13. A carton end panel having a central hole and peripheral flanges adapted to be secured to a carton outer cover, said panel having four rectangular slots therethrough each equidistant from the central hole and each equally disposed from a radial line from the center of the circle to the center of the slot by a chosen acute angle, diagonally opposite slots being parallel, whereby the end panel may receive a pronged supporting plate with the prongs extending through the slots and the plate then may be rotated slightly to prevent dust entering through a gap.

14. The carton end panel of claim 13 with a sheet metal stamping forming a support plate secured to the panel and having four equispaced integral prongs extending through said slots at right angles to the plate and each prong having a V notched formed by converging sloping sides, and a tube of a material having high elasticity but little strength against crushing gripped by all of said notches, said tube being adapted to extend to a similar and opposite end panel of the carton.

15. A carton comprising an elongated outer cover of four equal rectangular sides, two similar end panels each secured to the outer cover, a cardboard tube extending from one end panel to the other axially of the carton, a support plate secured centrally to each end panel and having prongs with V notches to receive and grip the tube, and four substantially radially positioned hook plates on each end panel to engage the tube and spaced to prevent lateral movement thereof, whereby when either end panel is rotated the tube will transmit torque to the other end panel.

16. The support plate of claim 9 in which the stamping has a continuous channel entirely surrounding the wedges and has holes for reception of securing means arranged in radial pairs, one on each side of the channel, there being one hole of each pair between proximate wedges.

References Cited in the file of this patent

UNITED STATES PATENTS

| 544,166 | Gregory | Aug. 6, 1895 |
| 650,272 | Perry | May 22, 1900 |
| 2,341,374 | Gardner | Feb. 8, 1944 |
| 2,356,787 | Hellyar | Aug. 29, 1944 |
| 2,518,279 | Bruder | Aug. 8, 1950 |
| 2,637,503 | Birr | May 5, 1953 |
| 2,767,953 | Wolar | Oct. 23, 1956 |
| 2,922,516 | Kessler | Jan. 26, 1960 |

FOREIGN PATENTS

| 292,665 | Great Britain | June 19, 1928 |